STEERABLE FOUR TRUCK MAIN LANDING GEAR FOR HEAVY AIRCRAFT
Filed July 25, 1967
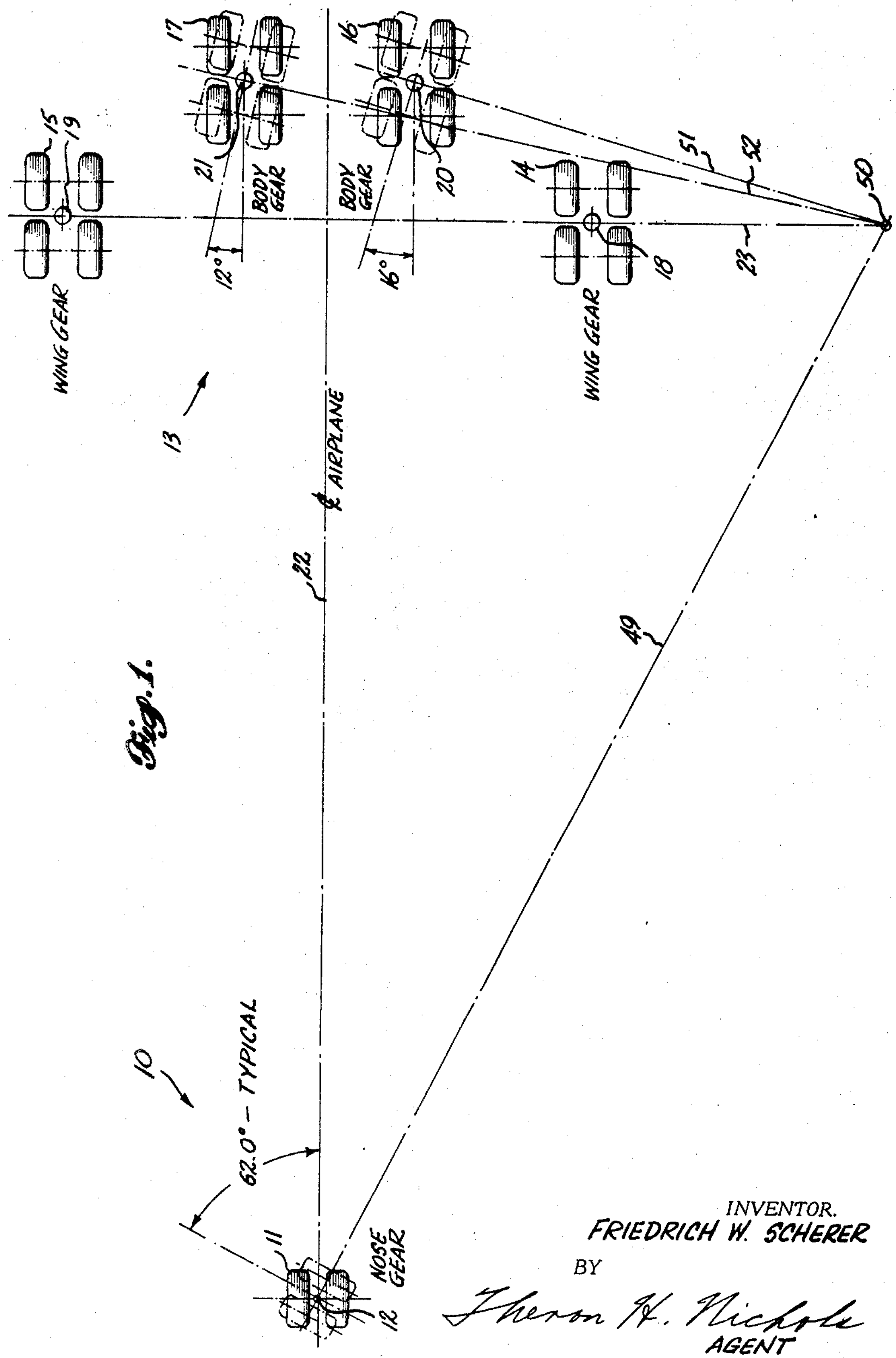

STEERABLE FOUR TRUCK MAIN LANDING GEAR FOR HEAVY AIRCRAFT
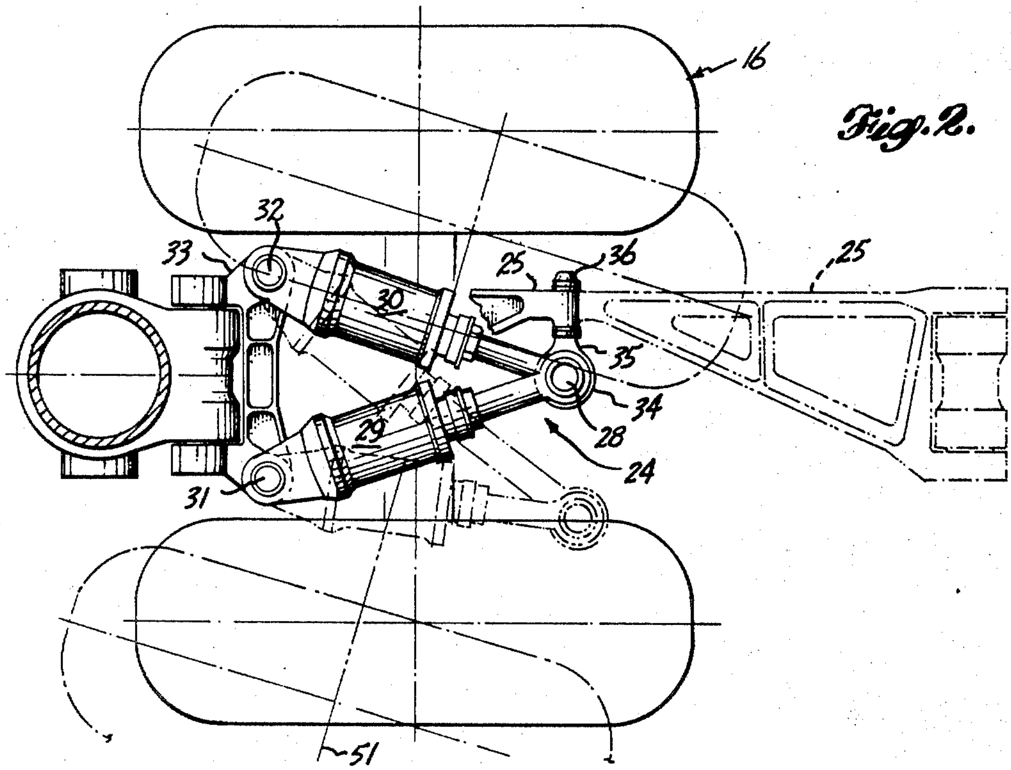
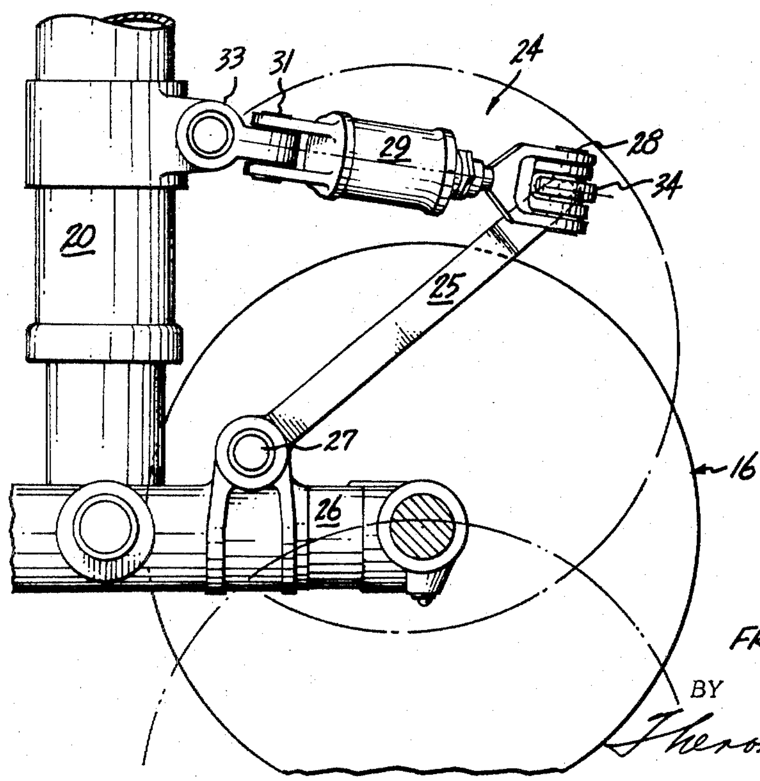
INVENTOR.
FRIEDRICH W. SCHERER
BY
Theron H. Nichols
AGENT STEERABLE FOUR TRUCK MAIN LANDING GEAR FOR HEAVY AIRCRAFT
Filed July 25, 1967
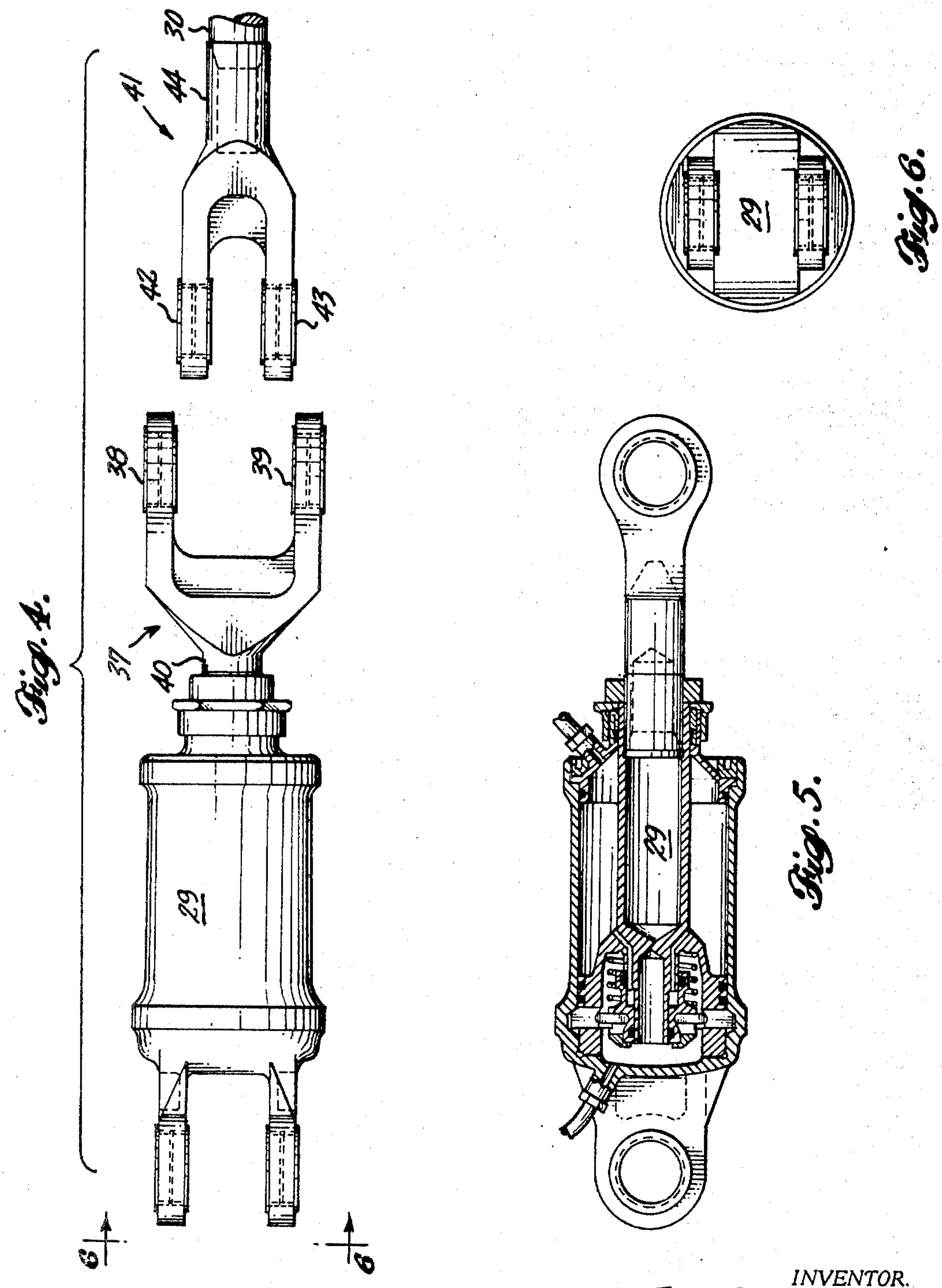
INVENTOR.
FRIEDRICH W. SCHERER
BY
Theron H. Nichols
AGENT STEERABLE FOUR TRUCK MAIN LANDING GEAR FOR HEAVY AIRCRAFT
Filed July 25, 1967 4 Sheets-Sheet 4
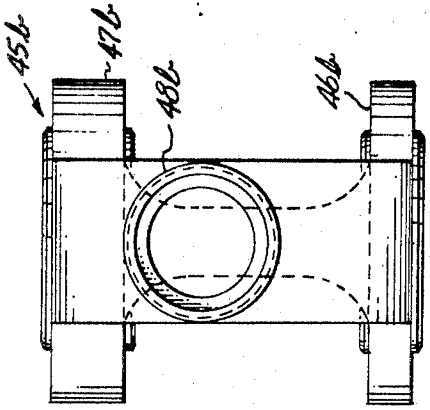
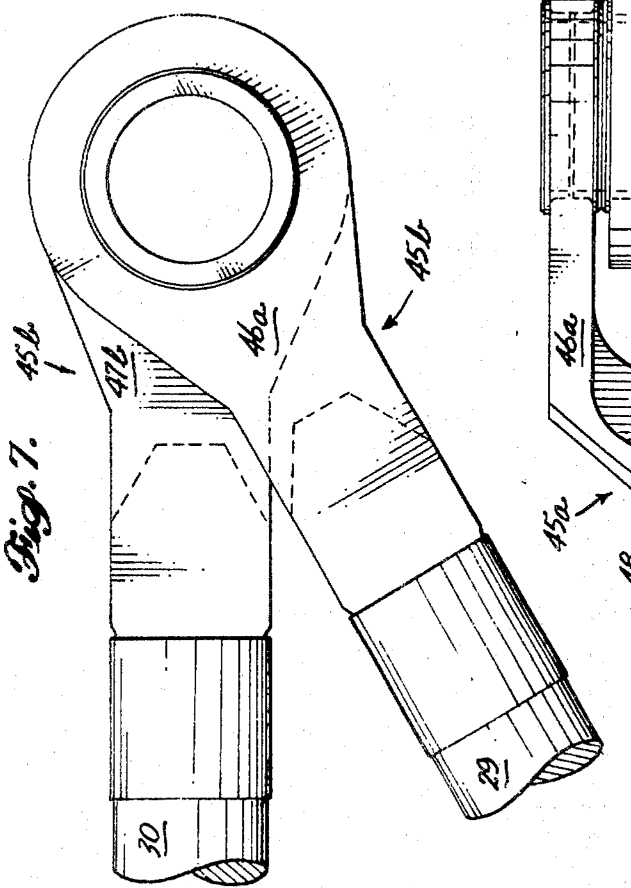
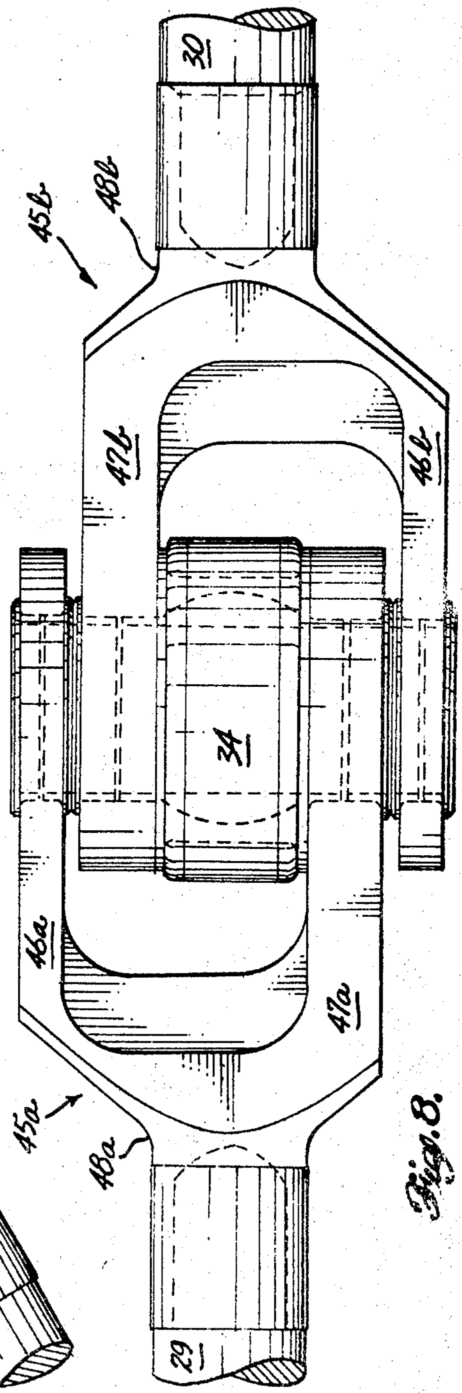
INVENTOR.
FRIEDRICH W. SCHERER
BY
Theron H. Nichols
AGENT United States Patent Office 3,488,020

Patented Jan. 6, 1970

3,488,020

STEERABLE FOUR TRUCK MAIN LANDING GEAR FOR HEAVY AIRCRAFT

Friedrich W. Scherer, Seattle, Wash., assignor to The Boeing Company, Seattle, Wash., a corporation of Delaware Filed July 25, 1967, Ser. No. 655,819
Int. Cl. B64c *25/50*
U.S. Cl. 244—50 3 Claims

ABSTRACT OF THE DISCLOSURE

A steerable main landing gear, preferably for the large type of aircraft weighing over 650,000 pounds, comprising an auxiliary landing gear, as a nose wheel, and a main landing gear, the latter comprising at least three trucks of wheels and preferably four trucks, two fore, laterally spaced apart, co-axial wing mounted trucks and two aft, laterally spaced apart, steerable, co-axial fuselage mounted trucks, and means for pivoting the aft steerable trucks during a turn oppositely to the nose wheel until their transverse axes intersect the transverse axis of the fore trucks at the point of intersection of the nose wheel transverse axis and the fore trucks' transverse axis for providing a more efficient landing gear to permit easier ground handling of the large aircraft through a smaller turning radius with no tire scrubbing, and with a minimum of tire wear.

Further, two embodiments of interconnecting terminals between the two steering actuator rods are disclosed to provide an efficient steering gear for large, heavy aircraft.

BACKGROUND OF THE INVENTION

Field of the invention

This invention appears to be classified in Class 244, Subclass 50, "Special devices not ordinarily used in steering or propelling in flight, incorporated with aircraft structure and particularly adapted to provide for steering and/or propelling the aircraft on land or water or both."

SUMMARY OF THE INVENTION

The disclosed invention is a steerable main landing gear for heavy aircraft, i.e., aircraft weighing 650,000 pounds or more, comprising an auxiliary landing gear as a nose wheel, and a main landing gear of at least three trucks of wheels and preferably four trucks, two coaxial fore trucks, and two steerable aft trucks. The main landing gear four-wheel trucks are staggered. In the preferred embodiment, for example, the two front trucks are co-axial and widely spaced apart relative to the two aft trucks which are more closely spaced apart and castorable. In the three truck embodiment the single truck may form either the fore row or the aft row with the remaining pair of trucks forming the other row, depending on the requirements of the particular design. In both three and four truck embodiments, means is provided for castoring the aft truck or trucks until their transverse axes intersect the fore truck's or trucks' transverse axis at the point of intersection of the nose wheel transverse axis and fore truck's or trucks' transverse axis for providing a more efficient landing gear to permit easier ground handling of the large aircraft through a smaller turning radius with no tire scrubbing and with a minimum of tire wear.

In addition, two modifications of a connecting terminal between the two steering actuator rods are disclosed. While the preferred modification comprising a fork on the end of each actuator to be interconnected, the forks on both actuators each having a thick prong and a thin prong on their shanks, and the thick prongs of each being positioned adjacent each other with a spherical bearing therebetween the thick prongs so that a bolt may be passed through all prongs to provide an interconnection or terminal comprising two identical, replaceable parts.

The other modification of a connecting terminal comprises two forks for the actuators, the prongs of one fork being widely spaced apart and the prongs of the other fork being closer to each other so that both prongs of the latter fork fit in between the prongs of the former fork for being bolted together.

A problem in the design of large, heavy aircraft, such as those weighing over 650,000 pounds is the provision of a landing gear that is steerable without resulting in scrubbing of the tires and excessive tire wear.

Accordingly, a principal object of this invention is to provide a multiple unit landing gear for heavy aircraft that may make sharp taxiing turns without resulting in scrubbing of the tires or excessive tire wear.

Another object of the disclosed invention is to provide a three or four truck staggered main landing gear for heavy aircraft that is steerable with a minimum of moving parts and resulting in no scrubbing of the tires nor excessive tire wear during sharp taxiing turns.

A further object of this invention is to provide a landing gear with an interconnecting terminal between the steering actuator rods which is strong, light, identical, and accordingly reduces inventory of spare parts.

Other objects and various advantages of the disclosed steerable main landing gear for heavy aircraft will be apparent from the following detailed description, together with the accompanying drawings, submitted for purposes of illustration only and not intended to define the scope of the invention.

BRIEF DESCRIPTIONS OF FIGURES

The drawings diagrammatically illustrate by way of example, not by way of limitation, two forms of the invention wherein like reference numerals designate corresponding parts in the several views in which:

FIG. 1 is a schematic plan view of the steering pattern for the landing gear trucks showing how they operate to produce an exact point of turning with a minimum of wheel scrubbing;

FIG. 2 is a schematic plan view, with parts cut away, of a typical pair of aft wheels of one of the main landing gear steerable aft wheel trucks;

FIG. 3 is a side view of the landing gear steerable aft wheel truck of FIG. 2;

FIG. 4 is an exploded side view of the interconnecting terminals for the steering actuator of the modification of FIGS. 2 and 3, the smaller fork being rotated to its true length position;

FIG. 5 is a front view of the steering actuator of FIGS. 2, 3, and 4, with parts cut away for clarity of disclosure;

FIG. 6 is a view taken at 6—6 on FIG. 4;

FIG. 7 is a plan view of a modification, the preferred embodiment, of the interconnected terminals of the actuator rods of the actuators of FIGS. 2 and 3;

FIG. 8 is a side view of the two interconnected terminals of FIG. 4 rotated to their true length position; and FIG. 9 is an end view of the right hand rod terminal of FIG. 8.

DESCRIPTION OF THE PREFERRED EMBODIMENTS

The invention is not limited in its application to the details of construction and arrangement of parts shown and described, since the invention is capable of other embodiments and of being practiced or carried out in various other ways. Also it is to be understood that the phraseology or terminology employed herein is for the purpose of description and not of limitation.

FIG. 1 illustrates in plan form, the preferred embodiment of the disclosed aircraft steerable staggered landing gear, showing in particular, an auxiliary landing gear as a steerable nose gear 10 comprising dual wheels 11 mounted on an oleo shock strut 12, and a steerable staggered main landing gear 13 as comprising four conventional, wheel trucks 14, 15, 16, and 17 of four wheels each mounted on two tandem axles to the lower ends of the four respective conventional oleo shock struts 18, 19, 20, and 21.

The main landing gear wheel trucks forms two transverse rows, the fore wheel trucks 14 and 15, each being fixed about its vertical axis, both being equally spaced about the aircraft longitudinal axis 22, and both being coaxial about the transverse axis 23 for forming the forward row, and the rear row consisting of the steerable aft wheel trucks 16 and 17, spaced inboard and aft of the fore trucks, and each being castorable about its vertical axis or shock strut 20 and 21, respectively. While the fore trucks 14 and 15 are fixed relative to castoring movement while taxiing, and while not a part of this invention, all of the landing gears are retractable.

Both fore fixed wheel trucks 14 and 15 consist of identical parts and both aft steerable wheel trucks 16 and 17 consist of identical parts. If the aircraft design so dictates, the disclosed invention or landing gear trucks may include skiis or pontoons for preventing sidewise movement over the ice or snow or through water for decreasing friction while taxiing.

FIGS. 2 and 3 disclose a portion of a main landing gear aft wheel truck 16, for example, illustrating the means 24 for castoring the aft truck.

FIG. 3, a side view of the aft steerable wheel truck 16 discloses the castoring means 24 comprising link 25 pivotally connected at its lower end to truck beam 26 and 27 and connected at its upper end with pin 28, FIG. 2 particularly, to two actuators 29 and 30 pivotally connected to the shock strut 20 with pins 31 and 32 of universal joint 33.

In FIG. 2, link 25 of the truck castoring means 20 is shown in broken lines, rotated to its full length position, only for clarity of disclosure. Pin 28 is a part of a conventional Ampex bolt, i.e. a bolt with a spherical bearing eye 34 for pin 28 on one end of its shank 35 and a nut 36 on the other end of the shank. Actuators 29 and 30 are conventional hydraulic actuators with a detent at the contracted position, such as but not limited to the hydraulic actuator Model 7–3424 manufactured by Lionel Pacific, Inc. of Gardena, California, schematically illustrated in greater detail in FIG. 5.

TERMINAL CONNECTION MOD. I

One terminal connection for the actuators 29 and 30 in FIGS. 2 and 3 is illustrated in greater detail in FIG. 4. Here FIG. 4 shows a wide fork 37 with perforated identical prongs 38 and 39 on shank 40 secured to the outer end of actuator 29 and a narrow fork 41 with perforated identical prongs 42 and 43 on shank 44 secured to the actuator 30. When assembled, narrow fork 41, FIG. 4, is inserted between the prongs of wide fork 37 and after the spherical bearing 34, FIG. 3, is inserted between the prongs of the narrow fork, all prongs and bearing are pivotally connected together with pin 28 and accordingly pivotally connected to link 25 through the Ampex bolt 34–35–36. With cutouts in the both forks where their prongs meet, the joint provides no interference for operation of the actuators, resulting in an efficient terminal connection for the actuators.

TERMINAL CONNECTION MOD. II

The preferred terminal connection for the actuators 29 and 30 is disclosed in FIGS. 7, 8, and 9, wherein each of the terminals or forks **45*a* and 45*b*, FIGS. 7 and 8, are identical. Each respective fork comprises identical small prongs 46*a* and 46*b* and identical large prongs 47*a* and 47*b* integral with identical shanks 48*a* and 48*b*, respectively, secured to the respective actuators 29 and 30 with a pin like 28 in FIGS. 2 and 3, with spherical bearing 34**, FIG. 5, positioned between the large prongs of the forks. Accordingly, a very strong but lighter and efficient terminal connection i.e., having higher strength-to-weight ratio, is illustrated in FIGS. 7, 8, and 9. Likewise, this modified terminal requires a reduced inventory of spare parts.

FIG. 9, an end view of fork **45*a* per se of FIG. 8, with the actuator 30 removed, illustrates the design of the fork with the large prong 47*b* and the small light prong 46*b*.**

METHOD OF TURNING AIRCRAFT WITH THE NEW LANDING GEAR

As illustrated in FIG. 1, when a turn to the left, for example, is desired while taxiing a large heavy aircraft of the 650,000 pound weight class or heavier requiring a main landing gear of at least four trucks of four wheels each, the truck wheels being in two pairs, or fore and aft tandem rows, the nose wheels are turned to the left by suitable pilot operation control (not shown), at a typical sharp angle of 62°, for example from the aircraft longitudinal axis whereby the nose wheel transverse axis 49 intersects the transverse axis 23 of the main landing gear fore trucks adjacent fore truck 14 at a point 50. Simultaneously, with the main landing gear fore trucks being maintained fixed and aligned with the aircraft longitudinal axis, each of the aft trucks 16 and 17 are rotated about their vertical axes or shock struts 20 and 21, respectively, by actuators 29 and 30, controlled by suitable pilot operation controls coordinated with the nose gear steering (not shown) until each of their transverse axes 51 and 52, respectively, likewise intersect the fore trucks' transverse axis 23 at point 50. This turning of the aft wheel trucks, as truck 16, FIGS. 1 and 2, for example, is accomplished by the application of hydraulic fluid to actuator 30, FIG. 2, expanding the actuator to move Apex bolt 34–35–36 and accompanying link 25 to the left in opposite direction of castoring of the nose wheel, as shown in broken lines in FIG. 2, to castor the wheel truck beam 26 of the wheel truck 16 about its shock strut 20 to the required angle.

MODIFICATION

In other heavy aircraft of the same weight class of 650,000 pounds, but with stronger wheel trucks and where the design doesn't dictate as great a footprint area, only three struts and three trucks may be required in the main landing gear. In this configuration, the front row would consist of two coaxial trucks of wheels, fixed about their vertical axes, and the rearward row would consist of the single, castorable truck of wheels, wherein during turns the aft single truck would be castored until its transverse axis intersected the transverse axis of the two coaxial fore trucks at the point where the nose wheeel transverse axis intersects the fore trucks' transverse axis to alleviate tire scrubbing and excessive tire wear.

Likewise in other heavy aircraft wherein the design dictates a three truck landing gear, the front row of main landing gears may consist of one truck of wheels fixed relative to its vertical axis and the rearward row would then consist of the two castorable trucks of wheels, wherein during turns, to the left, for example, simultaneously with turning of the nose wheel to the left until its transverse axis intersected the transverse axis of the fore wheel truck at a point adjacent the fore truck, both aft trucks are castored until the transverse axis of each intersects the fore truck transverse axis at the above identified point.

Thus, with the new landing gear structures set forth, aircraft may be turned about a point 50 on the transverse axis of the main landing gear fore wheel truck or trucks with no scrubbing of any of the sixteen or less wheels, nor excessive tire wear during sharp turns.

While a method and only a few embodiments of the invention have been shown in the accompanying specification and drawings, it will be evident that various other modifications are possible in the arrangement and construction of the disclosed steerable main landing gear for heavy aircraft without departing from the scope of the invention.

I claim:

1. A steerable staggered land gear for a large aircraft comprising, (a) an auxiliary landing gear comprising a steerable nose wheel connected to said aircraft, (b) a staggered main landing gear comprising two fore shock struts connected to said aircraft, two aft shock struts inboard of said two fore shock struts connected to said aircraft, and a multiple wheel truck having a transverse axis on each shock strut, (c) said steerable nose wheel being rotatable until its transverse axis intersects one of said fore wheel truck transverse axes at a point adjacent to one of said fore wheel truck transverse axes, (d) steering actuator means for rotating at least one of said aft wheel trucks in a direction oppositely to that of said nose wheel until its transverse axis intersects said point to alleviate tire scrubbing and tire wear during a sharp taxiing turn, (e) said steering actuator means pivotally connected between a link on one of said wheel trucks and its shock strut, said actuator means comprises two actuators pivotally connected to said strut, a link pivotally connected to one wheel truck, and terminal connecting means between said actuators and said link, and (f) said terminal connecting means comprises, (1) first fork means for one of said actuators having a shank and two prongs, (2) one of said prongs of said first fork means being thicker than the other prong, (3) second fork means for said second actuator similar to said first fork means, and (4) said thick prong of said first fork means being positioned between said prongs of said second fork means with a bearing positioned between said thick prongs, and a bolt pivotally connecting all prongs and bearing together for providing a higher strength-to-weight ratio in said terminal connecting means.

2. A steerable landing gear for a large aircraft comprising, (a) an auxiliary landing gear comprising a steerable nose wheel connected to said aircraft, (b) a staggered main landing gear comprising two fore shock struts connected to said aircraft, two aft shock struts inboard of said two fore shock struts connected to said aircraft, and a multiple wheel truck having a transverse axis on each shock strut, (c) both of said multiple wheel trucks have at least four wheels each, said fore wheel trucks are fixed relative to rotation about their vertical axes, (d) said steerable nose wheel being rotatable until its transverse axis intersects one of said fore wheel truck transverse axes at a point adjacent to one of said fore wheel truck transverse axes, (e) steering actuator means for rotating at least one of said aft wheel trucks in a direction oppositely to that of said nose wheel until its transverse axis intersects said point to alleviate tire scrubbing and tire wear during a sharp taxiing turn, and (f) said steering actuator means being pivotally connected between a link on one of said wheel trucks and its shock strut, said actuator means comprises two actuators pivotally connected to said strut, a link pivotally connected to one wheel truck, and terminal connecting means between said actuators and said link.

3. A steerable staggered landing gear for a large aircraft comprising, (a) an auxiliary landing gear comprising a steerable nose wheel connected to said aircraft, (b) a staggered main landing gear comprising two fore shock struts connected to said aircraft, two aft shock struts inboard of said two fore shock struts connected to said aircraft, and a multiple wheel truck having a transverse axis on each shock strut.

(c) both of said multiple wheel trucks have at least four wheels each, said fore wheel trucks are fixed relative to rotation about their vertical axes, (d) said steerable nose wheel being rotatable until its truck transverse axes at a point adjacent to one of said fore wheels truck transverse axes, (e) steering actuator means for rotating at least one of said aft wheel trucks in a direction oppositely to that of said nose wheel until its transverse axis intersects said point to alleviate tire scrubbing and tire wear during a sharp taxiing turn, (f) said steering actuator means pivotally connected between a link on one of said wheel trucks and its shock strut, said actuator means comprises two actuators pivotally connected to said strut, a link pivotally connected to one wheel truck, and terminal connecting means between said actuators and said link, and (g) said terminal connecting means comprises, (1) first fork means for one of said actuators having a shank and two prongs, (2) one of said prongs of said first fork means being thicker than the other prong, (3) second fork means for said second actuator similar to said first fork means, and (4) said thick prong of said first fork means being positioned between said prongs of said second fork means with a bearing positioned between said thick prongs, and a bolt pivotally connecting all prongs and bearing together for providing a higher strength-to-weight ratio in said terminal connecting means.

References Cited

UNITED STATES PATENTS

| | | | |
|---|---|---|---|
| 2,336,203 | 12/1943 | Warner | 244—104 |
| 2,418,325 | 4/1947 | Wassall et al. | 244—50 |
| 2,535,167 | 12/1950 | Smith et al. | 244—50 |
| 2,580,064 | 12/1951 | Albright | 244—50 |
| 3,261,574 | 7/1966 | Bowdy | 244—102 |
| 3,356,318 | 12/1967 | Livshits et al. | 244—102 XR |
| 2,577,385 | 12/1951 | Troendle | 244—102 |
| 2,606,726 | 8/1952 | Henion | 244—103 XR |
| 2,682,311 | 6/1954 | Bishop | 244—50 XR |
| 2,804,158 | 8/1957 | Yonker | 180—79.2 |
| 3,285,541 | 11/1966 | Fehring et al. | 244—50 |

FOREIGN PATENTS 535,098 3/1941 Great Britian.

OTHER REFERENCES

Aviation Week & Space Technology, Feb. 14, 1966, p. 38.

Aviation Week & Space Technology, Apr. 18, 1966, p. 41.

MILTON BUCHLER, Primary Examiner

P. E. SAUBERER, Assistant Examiner

U.S. Cl. X.R.

244—102